(12) United States Patent
Rottner et al.

(10) Patent No.: US 8,902,313 B2
(45) Date of Patent: Dec. 2, 2014

(54) AUTOMATIC IMAGE EQUALIZATION FOR SURROUND-VIEW VIDEO CAMERA SYSTEMS

(75) Inventors: Gunter Rottner, Wixom, MI (US); Frederic Marcel Sejalon, Commerce Township, MI (US); Jeffrey Bochenek, Milford, MI (US)

(73) Assignee: Robert Bosch GmbH, Stuttgart (DE)

( * ) Notice: Subject to any disclaimer, the term of this patent is extended or adjusted under 35 U.S.C. 154(b) by 400 days.

(21) Appl. No.: 13/287,440

(22) Filed: Nov. 2, 2011

(65) Prior Publication Data
US 2013/0107048 A1    May 2, 2013

(51) Int. Cl.
H04N 7/18 (2006.01)
H04N 5/232 (2006.01)
B60R 1/00 (2006.01)
H04N 5/235 (2006.01)

(52) U.S. Cl.
CPC ....... *H04N 5/23238* (2013.01); *H04N 5/23229* (2013.01); *B60R 2300/30* (2013.01); *B60R 1/00* (2013.01); *B60R 2300/105* (2013.01); *H04N 5/2351* (2013.01)
USPC .......................................... 348/148; 382/274

(58) Field of Classification Search
CPC .... B60R 1/00; B60R 2300/105; H04N 5/235; H04N 5/2351; H04N 7/18; G06T 3/4038; G06T 7/0022
USPC ..................... 348/38, 148, E07.085; 382/274
See application file for complete search history.

(56) References Cited

U.S. PATENT DOCUMENTS

| 6,813,391 | B1 * | 11/2004 | Uyttendaele et al. | 382/284 |
| 8,471,934 | B2 * | 6/2013 | Watanabe | 348/254 |
| 2002/0196340 | A1 * | 12/2002 | Kato et al. | 348/148 |
| 2003/0103141 | A1 * | 6/2003 | Bechtel et al. | 348/148 |
| 2009/0009604 | A1 * | 1/2009 | Kanaoka et al. | 348/148 |
| 2011/0285848 | A1 * | 11/2011 | Han et al. | 348/148 |
| 2012/0026333 | A1 * | 2/2012 | Okuyama | 348/148 |
| 2012/0177302 | A1 * | 7/2012 | Habuka et al. | 382/274 |

FOREIGN PATENT DOCUMENTS

| DE | 69612463 T2 | 11/2001 | |
| DE | 102007027420 B3 | 8/2008 | |
| DE | 102009025205 A1 | 4/2010 | |
| JP | 2007072750 | 3/2007 | |
| WO | WO 2010/079912 A1 * | 7/2010 | ............. B60R 11/04 |

OTHER PUBLICATIONS

Extended European Search Report for Application No. 12190253.0 dated Jul. 15, 2014 (9 pages).

* cited by examiner

*Primary Examiner* — William C Vaughn, Jr.
*Assistant Examiner* — Michael Bennett
(74) *Attorney, Agent, or Firm* — Michael Best & Friedrich LLP

(57) ABSTRACT

A method of automatically equalizing image data generated by a surround-view camera system of a vehicle. The method includes receiving a first, second, third, and fourth data set including image data corresponding to a front, left, right, and rear field of view of the vehicle, respectively. The method also includes identifying a darkest region in the first, second, and third data sets and adjusting a brightness of the image data included in the first, second, and third data sets based on the darkest region. The method further includes adjusting a brightness of the image data included in the fourth data set based on a comparison of the brightness of the image data included in the fourth data set and the adjusted brightness of the image data included in the second and third data sets.

15 Claims, 4 Drawing Sheets

AUTOMATIC IMAGE EQUALIZATION FOR SURROUND-VIEW VIDEO CAMERA SYSTEMS

SUMMARY

Many vehicles are equipped with video camera systems that provide drivers with live images of vehicle surroundings. Providing such images to a driver helps improve safety and facilitate difficult driving maneuvers such as parking or maneuvering through heavy traffic.

When a video camera system includes multiple cameras, the images received from the cameras can be combined or stitched together to produce one or more panoramic images. However, the individual images making up the panoramic image may have different image characteristics, such as contrast or brightness. Therefore, the resulting panoramic image may not provide a driver with a clear or consistent view of the areas surrounding the vehicle. Without a clear view, the viewer may not be able to safely or efficiently maneuver the vehicle. In addition, if other vehicle control systems, such as an object-detection system, use the panoramic image, errors or problems with the panoramic image may cause the vehicle control systems to malfunction or provide false alarms or alerts.

Therefore, embodiments of the invention provide an automatic image equalization method for 360° surround-view camera systems that creates a high-quality and homogeneous panoramic image. In one embodiment, the invention provides a surround-view camera system for a vehicle. The surround-view camera system includes a first camera, a second camera, a third camera, and a fourth camera. The first camera is positioned on a front side of the vehicle and produces a first data set that includes image data corresponding to a front field of view. The second camera is positioned on a left side of the vehicle and produces a second data set that includes image data corresponding to a left field of view. The third camera is positioned on a right side of the vehicle and produces a third data set that includes image data corresponding to a right field of view. The fourth camera is positioned on a rear side of the vehicle and produces a fourth data set that includes image data corresponding to a rear field of view. An electronic control unit receives the first data set, the second data set, the third data set, and the fourth data set. The electronic control unit identifies a darkest region in the first data set, the second data set, and the third data set and adjusts a brightness of the image data included in the first data set, the second data set, and the third data set based on the darkest region. The electronic control unit also adjusts a brightness of image data included in the fourth data set based on a comparison of the brightness of the image data included in the fourth data set and the adjusted brightness of the image data included in the second data set and the third data set.

In another embodiment, the invention provides a method of automatically equalizing image data generated by a surround-view camera system of a vehicle. The method is performed by an electronic control unit and includes receiving a first data set including image data corresponding to a front field of view of the vehicle, a second data set including image data corresponding to a left field of view of the vehicle, a third data set including image data corresponding to a right field of view of the vehicle, and a fourth data set including image data corresponding to a rear field of view of the vehicle. The method also includes identifying a darkest region in the first data set, the second data set, and the third data set and adjusting a brightness of the image data included in the first data set, the second data set, and the third data set based on the darkest region. The method further includes adjusting a brightness of the image data included in the fourth data set based on a comparison of the brightness of the image data included in the fourth data set and the adjusted brightness of the image data included in the second data set and the third data set.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium). As such, it should be noted that a plurality of hardware and software based devices, as well as a plurality of different structural components may be utilized to implement the invention.

Figure 1:
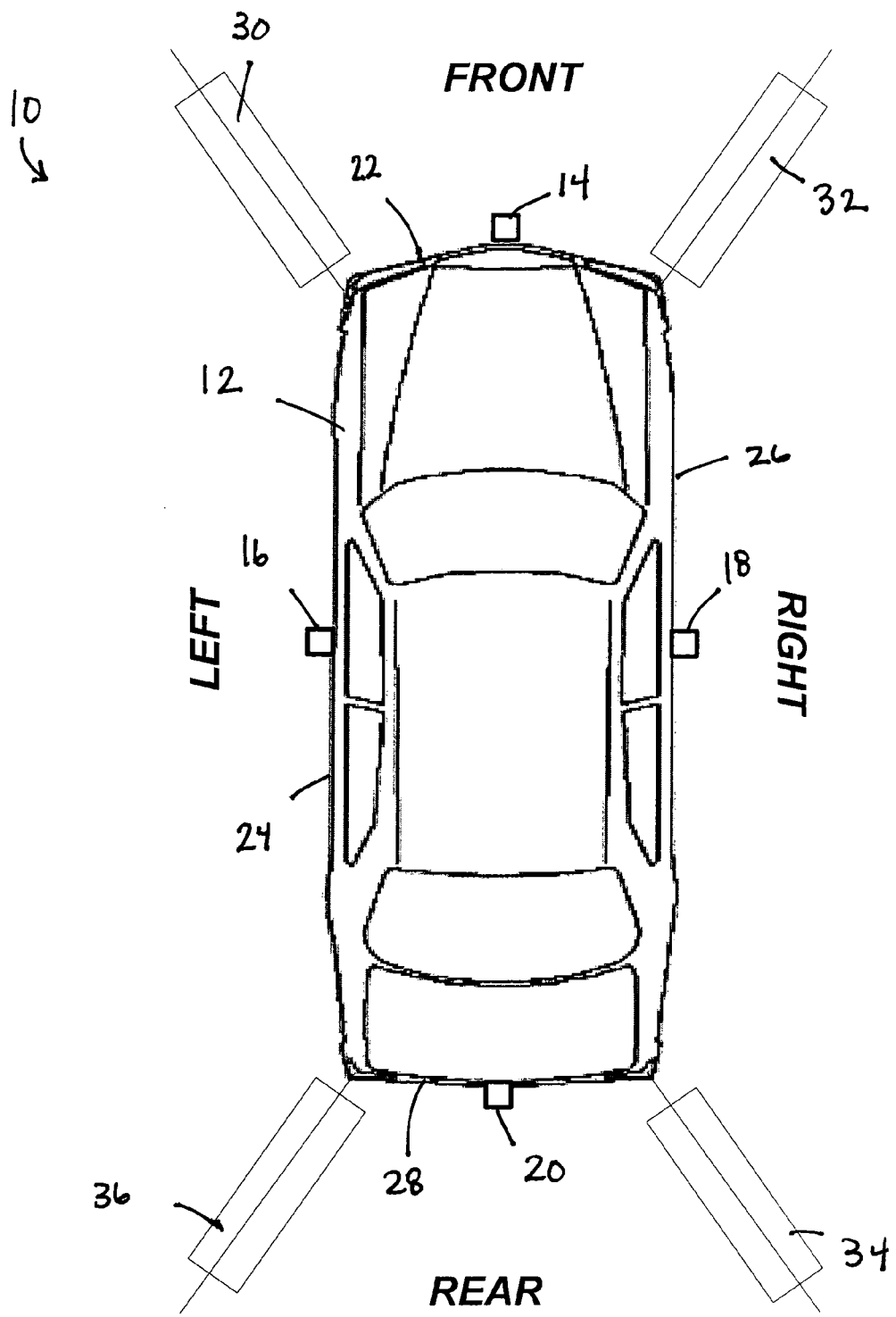
FIG. 1 is a top view of a vehicle including a surround-view camera system.

FIG. 1 illustrates a surround-view camera system 10 for a vehicle 12. As shown in FIG. 1, the system 10 includes a first camera 14, a second camera 16, a third camera 18, and a fourth camera 20. The first camera 14 is mounted on a front side 22 of the vehicle 12. The second camera 16 is mounted on a left side 24 of the vehicle 12. The third camera 18 is mounted on a right side 26 of the vehicle 12. The fourth camera 20 is mounted on a rear side 28 of the vehicle 12.

Each camera 14, 16, 18, and 20 includes a wide field of view lens. Therefore, the image data captured by each camera will overlap with the image data captured by two other cameras (i.e., the camera to the left and the camera to the right of the capturing camera). Accordingly, when the image data is stitched together (described below), four stitching areas 30, 32, 34, and 36 will be created based on the overlapping image data captured by the cameras 14, 16, 18, and 20.

Figure 2:
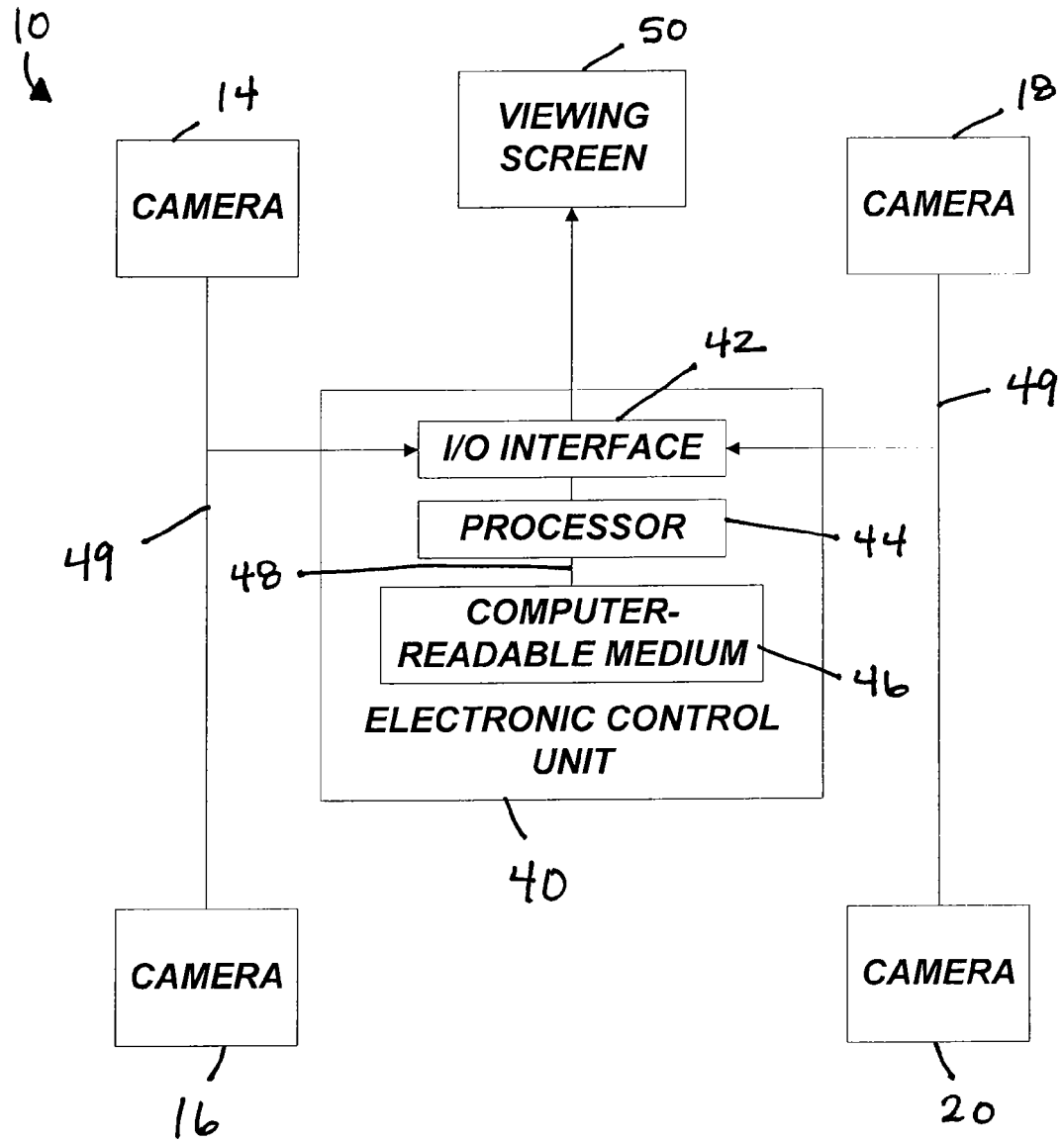
FIG. 2 schematically illustrates the surround-view camera system of FIG. 1.

FIG. 2 schematically illustrates the surround-view camera system 10. As shown in FIG. 2, the system 10 includes an electronic control unit ("ECU") 40. The ECU 40 includes an input/output ("I/O") 42 interface, a processor 44, and computer-readable medium 46 connected by one or more connections 48. It should be understood that the ECU 40 can include multiple processors, additional computer-readable medium modules, multiple I/O interfaces, and/or other additional components or modules (e.g., hardware, software, or a combination thereof).

The processor 44 retrieves and executes instructions stored in the computer-readable medium 46. The processor 44 also stores and retrieves data to and from the computer-readable medium 46. The computer-readable medium 46 includes non-transitory computer readable medium and includes volatile memory, non-volatile memory, or a combination thereof. The computer-readable medium 46 stores operating system software, applications and/or instructions, data, or combinations thereof.

The I/O interface 42 receives data from outside the ECU 40 and outputs information outside the ECU 40. In some embodiments, the I/O interface 42 may receive data from other devices or systems located in the vehicle 12. Similarly, the ECU 40 may be included within another vehicle control system rather than configured as a separate component. In addition, although not shown in FIG. 2, conditioning circuits or peripheral drivers may be used to interface the ECU 40 with the cameras 14, 16, 18, and 20.

Figure 3:
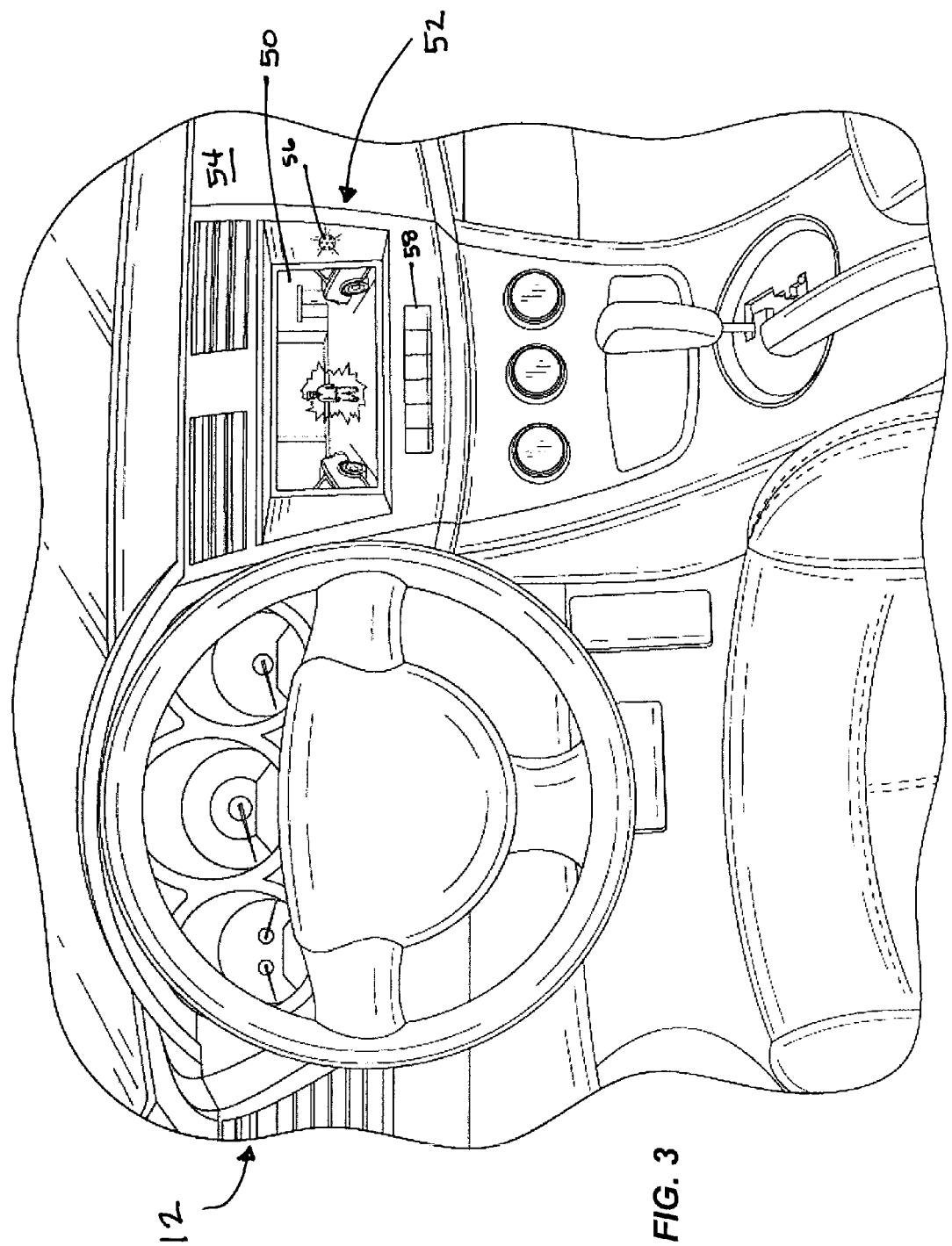
FIG. 3 illustrates a human-machine interface including a viewing screen that displays panoramic images produced by the surround-view camera system of FIG. 1.

The ECU 40 includes hardware and software and these components cooperate to execute the logic of the surround-view camera system 10. As shown in FIG. 2, the I/O interface 42 of the ECU 40 receives image data from the cameras 14, 16, 18, and 20 over one or more connections, such as a vehicle controller area network ("CAN") 49 and provides the image data to the processor 44 of the ECU 40. In some embodiments, the I/O interface 42 processes the image data from the cameras 14, 16, 18, and 20 before providing the images to the processor 44 of the ECU 40. As described in more detail below with respect to FIG. 4, the ECU 40 processes the image data, including performing automatic image equalization, and outputs one or more panoramic images produced from the image data to a viewing screen 50 (e.g., through the I/O interface 42). As shown in FIG. 3, the viewing screen 50 is part of a human-machine interface ("HMI") 52. The HMI 52 is positioned on a dashboard 54 of the vehicle 12 and provides information to a vehicle operator in various formats. In addition to the viewing screen 50, the HMI 52 can include a speaker 56 for providing audible information to the vehicle operator and/or one or more warning lights or light emitting diodes ("LEDs") 58 for providing visual information to the vehicle operator. In some embodiments, the HMI 52 also includes one or more haptic interfaces for providing tactile information to the vehicle operator, such as vibrations or movements in the vehicle's steering wheel, seat, brake pedal, etc.

Figure 4:
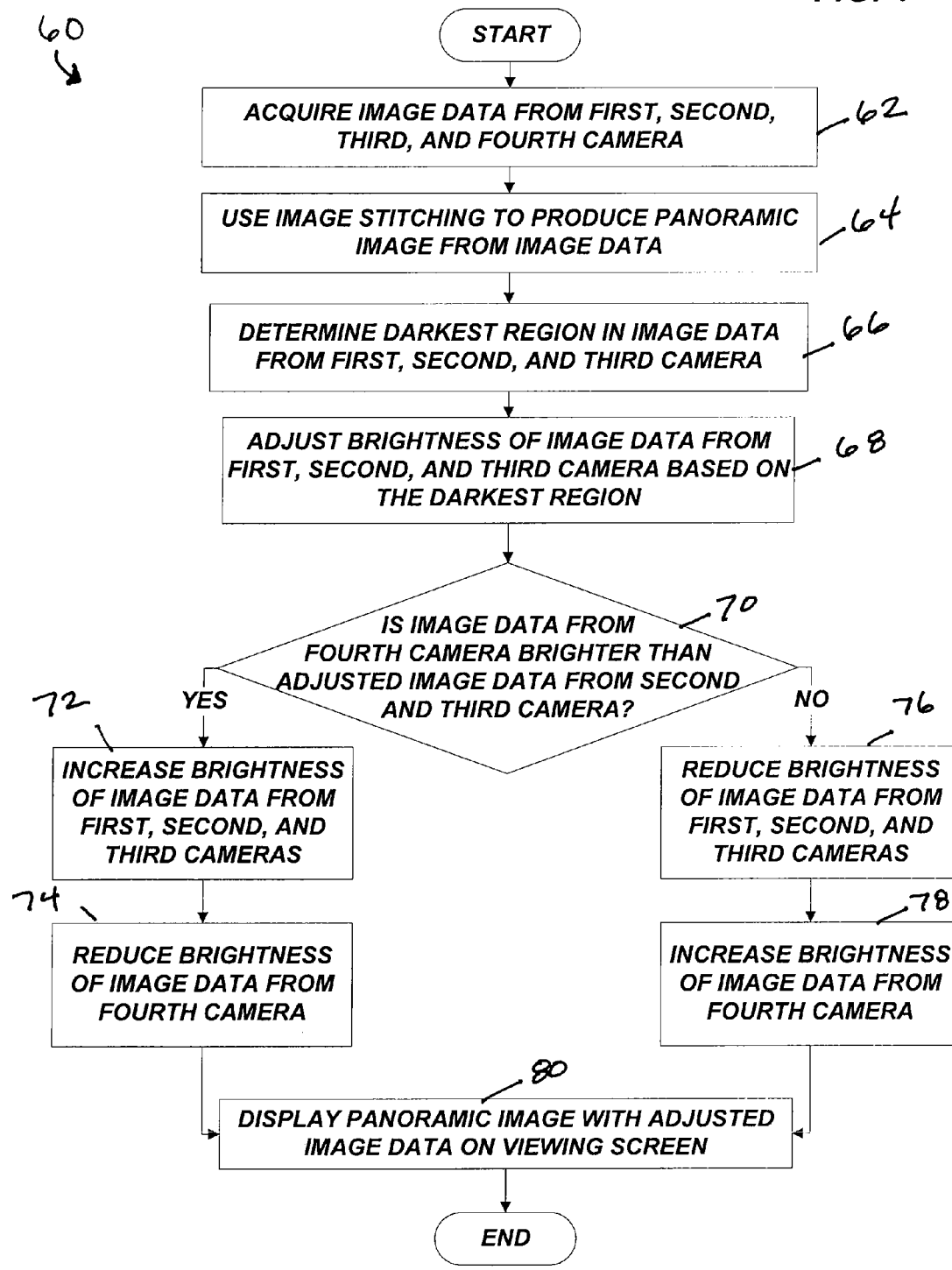
FIG. 4 illustrates the logic performed by a surround-view camera system of FIG. 1.

As noted above, the ECU 40 performs automatic image equalization. Image equalization is the process of adjusting the brightness of an image to improve its contrast. If image equalization is not performed, the images created from the image data received from the four cameras 14, 16, 18, and 20 may have varying contrasts and brightness, which make the resulting stitched images more difficult for an operator to view and interpret. FIG. 4 illustrates an image equalization method 60 performed by the ECU 40 according to one embodiment of the invention. The image equalization method 60 creates increased consistency in contrast and brightness between the image data received from the four cameras 14, 16, 18, and 20. For simplicity, one iteration of the logic of FIG. 4 is explained in detail below. However, it should be understood that the logic is executed rapidly by the ECU 40 and new image data is received by the ECU 40 and new panoramic images are displayed on the viewing screen 50 in a substantially continuous manner.

As shown in FIG. 40, after the vehicle 12 is turned on (and after the surround-view camera system 10 is activated, which may occur by default when the vehicle is started), the ECU 40 receives a data set including image data from each of the four cameras 14, 16, 18, and 20 (at 62). The data set from each camera includes image data including an array of pixels that correspond to a field of view around the vehicle. For example, the data set from the first camera includes image data corresponding to a front field of view and the data set from the second camera includes image data corresponding to a left field of view.

After the ECU 40 has received the data sets from the four cameras 14, 16, 18, and 20, the ECU 40 produces one or more panoramic images from the received image data using image stitching (at 64). Image stitching combines or "stitches" together multiple images with overlapping fields of view to produce a single panoramic image. Image stitching includes multiple steps or processes, such as calibrating the individual images, registering the images using direct or feature-based image alignment methods to determine image orientation and overlaps, and blending the multiple images to combine overlapping sections and correct errors or distortions.

Next, the ECU 40 adjusts the brightness of the image data received from the first camera 14, the second camera 16, and the third camera 18 (i.e., the front, left, and right cameras). As shown in FIG. 4, this adjustment includes determining a darkest region in the image data received from the first, second, and third cameras 14, 16, and 18 (at 66) and adjusting the brightness of the image data from these cameras based on the darkest region (at 68). In some embodiments, the ECU 40 determines a darkest region in the image data by comparing the pixel intensity of the stitching areas 30 and 32 generated when the image data from the three cameras 14, 16, and 18 is image stitched. In other embodiments, the ECU 40 determines a darkest region within the entire image data received from each of the three cameras 14, 16, and 18. Once the ECU 40 identifies the darkest region, the ECU 40 adjusts the brightness of the image data from the three cameras 14, 16, and 18 by comparing the pixel intensity value of the darkest region to pre-set image adjustment settings. The pre-set image adjustment settings can provide brightness adjustments based on the pixel intensity of the darkest region (e.g., in the form of a look-up table or a formula). The brightness adjustment can ensure that the overall image data is not too dark or too light where objects in extreme dark or bright regions are unidentifiable by the vehicle operator. Therefore, the pre-set image setting can increase or decrease the brightness of the image data from the three cameras 14, 16, and 18 to ensure that image data has a useful contrast. In some embodiments, the ECU 40 only adjusts the brightness of the image data in the stitching areas 30 and 32. In other embodiments, the ECU 40 adjusts the brightness of the entire image data received from each of the three cameras 14, 16, and 18.

After the ECU 40 has adjusted the brightness of the image data received from the first, second, and third cameras 14, 16, and 18 (or portions thereof), the ECU 40 adjusts the image brightness of the image data from the fourth camera 20 (i.e., the rear camera). As shown in FIG. 4, this adjustment includes determining whether the image data from the fourth camera 20 is brighter than the adjusted image data from the second and third cameras 16 and 18 (at 70). In some embodiments, to compare the brightness of the image data from the different cameras, the ECU 40 determines if an average brightness of the image data received from the fourth camera 20 is greater than an average brightness of the image data received from the second and third cameras 16 and 18. In other embodiments, the ECU 40 compares brightness by analyzing image data contained in the stitching areas 34 and 36. In particular, the ECU 40 can determine if the image data from the second and third cameras 16 and 18 (as adjusted at 68) is brighter than overlapping image data from the fourth camera 20. Other comparison techniques can also be used, such as comparing pre-set pixels in each data set received from the cameras 16, 18, and 20.

As shown in FIG. 4, if the image data from the fourth camera 20 is brighter than the adjusted image data from the second and third cameras 16 and 18 (at 70), the ECU 40 increases the brightness of the image data from the first, second, and third cameras 14, 16, and 18 (at 72) and reduces the brightness of the image data from the fourth camera 40 (at 74). Alternatively, if the image data from the fourth camera 20 is not brighter than the adjusted image data from the second and third cameras 16 and 18 (at 70), the ECU 40 reduces the brightness of the image data from the first, second, and third cameras 14, 16, and 18 (at 76) and increases the brightness of the image data from the fourth camera 40 (at 78). These adjustments ensure that the brightness of the image data from each of the four cameras does not vary drastically from the other cameras. The brightness increases and reductions can be based on a pre-set adjustment setting or may vary based on the difference in brightness between the image data from the fourth camera 20 and the image data from the second and third cameras 16 and 18.

After the ECU 40 has adjusted the image data from the fourth camera 20, the ECU 40 displays the panoramic image (or a portion thereof), which includes the adjusted image data, to the operator on the viewing screen 50 (at 80). In some embodiments, the panoramic image is updated as the ECU 40 adjusts the image data. In other embodiments, the ECU 40 may reproduce the panoramic image after performing the brightness adjustments. In still other embodiments, the ECU 40 generates the panoramic image only after the brightness adjustments have been made. Also, it should be understood that the ECU 40 may add additional information to the panoramic image, such as by highlighting, marking, or flashing tracked objects in the image or may illuminate one of the warning lights 58, output an audible alert with the speaker 56, and/or generate a tactile warning with a haptic interface on the HMI (see FIG. 3) based on one or more objects identified in the panoramic image. The ECU 40 may also transmit the panoramic images to one or more separate vehicle components or systems to perform object identification based on the images and generate the appropriate driver alerts.

It should be understood that the process of "increasing" or "reducing" the brightness of image data is generally synonymous with "increasing" or "reducing" the exposure gain of the image data. However, other specific processes could be used to "increase" or "reduce" the brightness of image data, such as by adjusting the image data's contrast, color scheme, compression ratio, size, perspective, etc. or by performing image masking or deconvolution or noise reduction. Furthermore, the brightness adjustment can be performed by the ECU 40 or by one of the cameras 14, 16, 18, or 20 (e.g., when commanded by the ECU 40).

Also, in some embodiments, the first camera 14 can be located at the rear side 28 of the vehicle 12 and the fourth camera 20 can be located at the front side 22 of the vehicle 12. Therefore, in these embodiments, when the ECU 40 adjusts the image brightness as described above, the ECU 40 first adjusts the image data collected from the rear side 28, the left side 24, and the right side 26 of the vehicle 12 and then uses the adjusted image data to adjust the image data collected from the front side 22, the left side 24, and the right side 26 of the vehicle 12. Furthermore, in some embodiments, the camera system 10 only includes three cameras (e.g., the vehicle only includes the second, third, and fourth cameras 16, 18, and 20). In these embodiments, the ECU 40 is configured to adjust the brightness of the image data received from two of the three cameras and then uses the adjusted image data to adjust the brightness of the remaining image data received from the third camera similar to as described above for a four-camera system.

Thus, the invention provides, among other things, a surround-view camera system that provides an equalized panoramic image. Various features and advantages of the invention are set forth in the following claims.

What is claimed is:

1. A surround-view camera system for a vehicle, the surround-view camera system comprising:
    a first camera positioned on a front side of the vehicle, the first camera producing a first data set including image data corresponding to a front field of view;
    a second camera positioned on a left side of the vehicle, the second camera producing a second data set including image data corresponding to a left field of view;
    a third camera positioned on a right side of the vehicle, the third camera producing a third data set including image data corresponding to a right field of view;
    a fourth camera positioned on a rear side of the vehicle, the fourth camera producing a fourth data set including image data corresponding to a rear field of view; and
    an electronic control unit configured to
        receive the first data set, the second data set, the third data set, and the fourth data set;
        identify a darkest region in the first data set, the second data set, and the third data set without considering the fourth data set;
        adjust a brightness of the image data included in the first data set, the second data set, and the third data set based on the darkest region without adjusting the fourth data set; and
        adjust a brightness of image data included in the fourth data set based on a comparison of the brightness of the image data included in the fourth data set and the adjusted brightness of the image data included in the second data set and the third data set without considering the first data set.

2. The surround-view camera system of claim 1, wherein the electronic control unit image stitches the adjusted image data included in the first data set, the second data set, the third data set, and the fourth data to produce a panoramic image.

3. The surround-view camera system of claim 2, further comprising a human-machine interface including a viewing screen positioned adjacent an operator of the vehicle, the human-machine interface configured to receive the panoramic image and display at least a portion of the panoramic image on the viewing screen.

4. The surround-view camera system of claim 1, wherein the electronic control unit identifies the darkest region by analyzing pixel intensity in a first and second stitching area created when the image data from the first data set, the second data set, and the third data set are image stitched.

5. The surround-view camera system of claim 1, wherein the electronic control unit adjusts the brightness of the image data included in the first data set, the second data set, and the third data set based on the darkest region by identifying a pre-set image adjustment setting based on a pixel intensity of the darkest region.

6. The surround-view camera system of claim 1, wherein the electronic control unit adjusts the brightness of the image data included in the fourth data set by reducing the brightness of the image data included in the fourth data set if the image data included in the fourth data set is brighter than the adjusted image data included in the second data set and the third data set.

7. The surround-view camera system of claim 6, wherein the electronic control unit increases the adjusted brightness of the image data included in the first, second, and third data sets if the image data included in the fourth data set is brighter than the adjusted image data included in the second data set and the third data set.

8. The surround-view camera system of claim 1, wherein the electronic control unit adjusts the brightness of the image data included in the fourth data set by increasing the brightness of the image data included in the fourth data set if the image data included in the fourth data set is not brighter than the adjusted image data included in the second data set and the third data set.

9. The surround-view camera system of claim 8, wherein the electronic control unit decreases the adjusted brightness of the image data included in the first, second, and third data sets if the image data included in the fourth data set is not brighter than the adjusted image data included in the second data set and the third data set.

10. A method of automatically equalizing image data generated by a surround-view camera system of a vehicle, the method comprising:
receiving, at an electronic control unit, a first data set including image data corresponding to a front field of view of the vehicle, a second data set including image data corresponding to a left field of view of the vehicle, a third data set including image data corresponding to a right field of view of the vehicle, and a fourth data set including image data corresponding to a rear field of view of the vehicle;
identifying, at the electronic control unit, a darkest region in the first data set, the second data set, and the third data set without considering the fourth data set;
adjusting, at the electronic control unit, a brightness of the image data included in the first data set, the second data set, and the third data set based on the darkest region without adjusting the fourth data set; and
adjusting, at the electronic control unit, a brightness of the image data included in the fourth data set based on a comparison of the brightness of the image data included in the fourth data set and the adjusted brightness of the image data included in the second data set and the third data set without considering the first data set.

11. The method of claim 10, further comprising image stitching, at the electronic control unit, the adjusted image data included in the first data set, the second data set, the third data set, and the fourth data to produce a panoramic image and displaying at least a portion of the panoramic image on a viewing screen.

12. The method of claim 10, wherein adjusting, at the electronic control unit, the brightness of the image data included in the fourth data set includes reducing the brightness of the image data included in the fourth data set if the image data included in the fourth data set is brighter than the adjusted image data included in the second data set and the third data set.

13. The method of claim 12, further comprising increasing, at the electronic control unit, the adjusted brightness of the image data included in the first, second, and third data sets if the image data included in the fourth data set is brighter than the adjusted image data included in the second data set and the third data set.

14. The method of claim 10, wherein adjusting, at the electronic control unit, the brightness of the image data included in the fourth data set includes increasing the brightness of the image data included in the fourth data set if the image data included in the fourth data set is not brighter than the adjusted image data included in the second data set and the third data set.

15. The method of claim 14, further comprising reducing, at the electronic control unit, the adjusted brightness of the image data included in the first, second, and third data sets if the image data included in the fourth data set is not brighter than the adjusted image data included in the second data set and the third data set.

* * * * *